(12) United States Patent
Frerichs

(10) Patent No.: US 8,815,032 B2
(45) Date of Patent: Aug. 26, 2014

(54) METHOD FOR PRODUCING A TREAD RUBBER FOR A VEHICLE TIRE, IN PARTICULAR A PNEUMATIC VEHICLE TIRE

(75) Inventor: Udo Frerichs, Langenhagen (DE)

(73) Assignee: Continental Aktiengesellschaft, Hannover (DE)

( * ) Notice: Subject to any disclaimer, the term of this patent is extended or adjusted under 35 U.S.C. 154(b) by 1037 days.

(21) Appl. No.: 12/258,882

(22) Filed: Oct. 27, 2008

(65) Prior Publication Data

US 2009/0095390 A1 Apr. 16, 2009

Related U.S. Application Data

(63) Continuation of application No. PCT/EP2007/001893, filed on Mar. 6, 2007.

(30) Foreign Application Priority Data

Apr. 26, 2006 (DE) .......................... 10 2006 019 262

(51) Int. Cl.
*B29D 30/60* (2006.01)
*B60C 19/08* (2006.01)

(52) U.S. Cl.
USPC ............... 156/117; 152/152.1; 152/209.5; 156/130

(58) Field of Classification Search
USPC ............ 156/117, 130, 397, 96; 152/152.1, 152/209.5, DIG. 2
See application file for complete search history.

(56) References Cited

U.S. PATENT DOCUMENTS

| 3,223,572 A * | 12/1965 | Holloway et al. ............. 156/397 |
| 2002/0007893 A1 | 1/2002 | Koyama et al. |
| 2006/0042733 A1 | 3/2006 | Matsui |
| 2006/0042737 A1 | 3/2006 | Hayashi et al. |
| 2006/0174986 A1 | 8/2006 | Ogawa |

FOREIGN PATENT DOCUMENTS

| EP | 0798142 A1 * | 10/1997 |
| EP | 1 175 992 B1 | 1/2002 |
| EP | 1 629 964 A2 | 3/2006 |
| EP | 1 632 367 A1 | 3/2006 |
| EP | 1 645 442 A1 | 4/2006 |
| JP | 11-139107 A * | 5/1999 |
| WO | WO-2005/108048 A1 * | 11/2005 |

OTHER PUBLICATIONS

International Search Report, dated May 18, 2007.

* cited by examiner

*Primary Examiner* — Geoffrey L Knable
(74) *Attorney, Agent, or Firm* — Laurence A. Greenberg; Werner H. Stemer; Ralph E. Locher

(57) ABSTRACT

A process for producing a tread for a tire with a radially inner layer composed of a first rubber material and with a radially outer second layer composed of a second rubber material and forming the ground-contact surface of the pneumatic tire. The first rubber material has higher electrical conductivity than the second rubber material, and where, in a form of a web axially dividing the second layer around the periphery of the tire, the first rubber material extends radially outwards through the second layer as far as the ground-contact surface. A ply of the first and second layers are constructed radially one on the other, on a rotationally symmetric construction surface, on one of the two axial sides of the web to be produced.

7 Claims, 8 Drawing Sheets

40

41

42

US 8,815,032 B2

METHOD FOR PRODUCING A TREAD RUBBER FOR A VEHICLE TIRE, IN PARTICULAR A PNEUMATIC VEHICLE TIRE

CROSS-REFERENCE TO RELATED APPLICATION

This is a continuation application, under 35 U.S.C. §120, of copending international application No. PCT/EP2007/001893, filed Mar. 6, 2007, which designated the United States; this application also claims the priority, under 35 U.S.C. §119, of German patent application No. DE 10 2006 019 262.1, filed Apr. 26, 2006; the prior applications are herewith incorporated by reference in their entirety.

BACKGROUND OF THE INVENTION

Field of the Invention

The invention relates to a method for producing a tread rubber for a vehicle tire—in particular a pneumatic vehicle tire—with a radially inner layer of a first rubber material and a radially outer second layer of a second rubber material, forming the ground-contact surface of the pneumatic tire. The first rubber material has in particular a higher electrical conductivity than the second rubber material, and the first rubber material extends radially outward through the second layer up to the ground-contact surface in the form of a web that is made to extend over the circumference of the pneumatic tire and axially divides the second layer. The invention further relates to a tread rubber of a vehicle tire—in particular a pneumatic vehicle tire—with a radially inner layer of a first rubber material and a radially outer second layer of a second rubber material, forming the ground-contact surface of the pneumatic tire. The first rubber material has in particular a higher electrical conductivity than the second rubber material. The first rubber material extends radially outward through the second layer up to the ground-contact surface in the form of a web that is made to extend over the circumference of the pneumatic tire and axially divides the second layer.

A method for producing a pneumatic vehicle tire of this type is known, for example, from European patent EP 1 175 992 B1, corresponding to U.S. Patent Application Publication No. US 2002/0007893 A1. In the case of this method, an electrically conductive layer is formed axially inside a portion of a first radially outer rubber layer formed from a cap mixture, wherein the electrically conductive layer extends from the second rubber layer, formed from a base mixture radially inside the outer rubber layer, as a web of narrow cross section radially outward up to the ground contact surface of the tread. The layer forming the narrow web is produced in an independent production operation by a narrow ribbon-shaped strip of rubber being wound around the already built-up second rubber layer in a number of turns arranged radially one on top of the another. The congruent turns of the ribbon-shaped rubber strip are in each case formed with the same axial width. Subsequently, the rubber material for forming the first rubber layer is built up successively on both sides of the web, wherein a dependable connection between the web and the rubber material for forming the first rubber layer also has to be produced without any formation of air pockets. Adequately high pressing forces are required for this. In order that the web cannot inadmissibly tilt out of its position in the process, the rubber ribbon must be made as wide as possible. However, being made wide has the effect of reducing the contact surface area of the first rubber layer of the vehicle tire, formed from the cap mixture, with respect to the surface of the roadway that is important for the running characteristics.

SUMMARY OF THE INVENTION

It is accordingly an object of the invention to provide a method for producing a tread rubber for a vehicle tire, in particular a pneumatic vehicle tire, which overcomes the above-mentioned disadvantages of the prior art devices and methods of this general type, which provides a simple dependable production method for making the pneumatic vehicle tire—possible with a tread rubber with a radially inner layer of a first rubber material and a radially outer second layer of a second rubber material, forming the ground-contact surface of the pneumatic tire. The first rubber material has in particular a higher electrical conductivity than the second rubber material, and the first rubber material extends radially outward through the second layer up to the ground-contact surface in the form of a web that is made to extend over the circumference of the pneumatic tire and axially divides the second layer, for which it is possible to design the running properties in an optimized manner in spite of a good connection between the second rubber layer and the surface of the roadway.

The object is achieved according to the invention by the method for producing a tread rubber for a vehicle tire—in particular a pneumatic vehicle tire—with a radially inner layer of a first rubber material and a radially outer second layer of a second rubber material, forming the ground-contact surface of the pneumatic tire. The first rubber material has in particular a higher electrical conductivity than the second rubber material. The first rubber material extends radially outward through the second layer up to the ground-contact surface in the form of a web that is made to extend over the circumference of the pneumatic tire and axially divides the second layer. A ply of the first layer of a first rubber material and a ply of the second layer of a second rubber material are built up radially one on top of the other on a rotationally symmetrical building surface, on one of the two axial sides of the web to be formed, in each case in a first region of axial extent which reaches up to the position of the web, in which, starting from the other axial side of the web to be formed, in a second region of axial extent, the ply of the first layer is closed in the axial direction by helically winding on a ribbon-shaped rubber strip of the first rubber material, with a number of turns arranged axially next to one another or at least partly axially overlapping about the axis of rotation up to the ply already formed for the first layer in the first region of axial extent, whereupon, on reaching the ply formed for the first layer in the region of axial extent, the ribbon-shaped rubber strip is further wound in contact with the axial end face first of the ply formed for the first layer in the first region of extent and then of the second layer, using a number of turns to form the web in a helical or spiral manner radially outward about the axis of rotation up to the envelope of the tread rubber to be built up, and in which, in the second region of axial extent, the second layer of the second rubber material is built up axially up to the web.

Independently of this, the object is achieved according to the invention by the forming of a tread rubber of a vehicle tire—in particular a pneumatic vehicle tire—with a radially inner layer of a first rubber material and a radially outer second layer of a second rubber material, forming the ground-contact surface of the pneumatic tire. The first rubber material has in particular a higher electrical conductivity than the second rubber material. The first rubber material extends radially outward through the second layer up to the ground-contact surface in the form of a web that is made to extend over the circumference of the pneumatic tire and axially divides the second layer, in which a ply of the first layer of a first rubber material and the second layer of a second rubber material are built up radially one on top of the other, on one of the two axial sides of the web, in each case in a first region of axial extent which reaches up to the position of the web, and in which, starting from the other axial side of the web, in a second region of axial extent, an uninterrupted, ribbon-shaped rubber strip of the first rubber material is made to extend helically with a number of turns arranged axially next to one another or at least partly axially overlapping about the axis of rotation of the vehicle tire up to the ply already formed for the first layer in the first region of axial extent. The ply of the first layer is formed such that it is closed in the axial direction, and in interrupted continuation of the strip-shaped rubber strip from the inside outward in the radial sense, in contact with the axial end face of the ply formed for the first layer in the first region of extent and of the second layer, the web is formed using a number of helically and/or spirally formed turns of the ribbon-shaped rubber strip about the axis of rotation of the pneumatic vehicle tire.

In this way, the tread rubber can be produced with a web with great accuracy by only a few working steps. In a single operation, the web is precisely placed with part of the ply of the first layer and built up in a supported manner along the already built-up part of the first and second layers. In this way, the web can be formed in a dependably supported and nevertheless narrow form, so that stable, precisely defined positioning in the tread rubber is made possible during production, with a narrow contact surface area with respect to the surface of the roadway.

In accordance with a feature of the invention, the ply of the first layer is built up in the first axial region of extent by helically winding on a ribbon-shaped rubber strip of the first rubber material with a number of turns arranged axially next to one another or at least partly axially overlapping about the axis of rotation, is particularly advantageous. This allows a securely interlocked ply assembly to be accomplished and at the same time the respectively required volume of the assembly to be economically built up at the respectively relevant locations.

In accordance with a further feature of the invention, the second layer is also built up in the first region of axial extent by helically winding on a ribbon-shaped rubber strip of the first rubber material with a number of turns arranged axially next to one another or at least partly axially overlapping about the axis of rotation, is particularly advantageous. This allows a securely interlocked ply assembly to be accomplished and at the same time the respectively required volume of the assembly to be economically built up at the respectively relevant locations.

In accordance with another feature of the invention, the second layer is also built up in the second region of axial extent by helically winding on a ribbon-shaped rubber strip of the first rubber material with a number of turns arranged axially next to one another or at least partly axially overlapping about the axis of rotation, is particularly advantageous. This allows a securely interlocked ply assembly to be accomplished and at the same time the respectively required volume of the assembly to be economically built up at the respectively relevant locations.

In accordance with a concomitant feature of the invention, the ply of the first layer, on which the second layer is built up, is the radially outer ply of a multi-ply—in particular two-ply—first layer of the first rubber material, wherein in particular the ply of the first layer that is formed radially inside the radially outer ply is built up by helically winding on the ribbon-shaped rubber strip of the first rubber material with a number of turns arranged axially next to one another or at least partly axially overlapping about the axis of rotation and after that the radially outer ply in the first axial region of extent, is particularly advantageous. This allows a securely interlocked ply assembly to be accomplished and at the same time the respectively required volume of the assembly to be economically built up at the respectively relevant locations.

Other features which are considered as characteristic for the invention are set forth in the appended claims.

Although the invention is illustrated and described herein as embodied in a method for producing a tread rubber for a vehicle tire, in particular a pneumatic vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
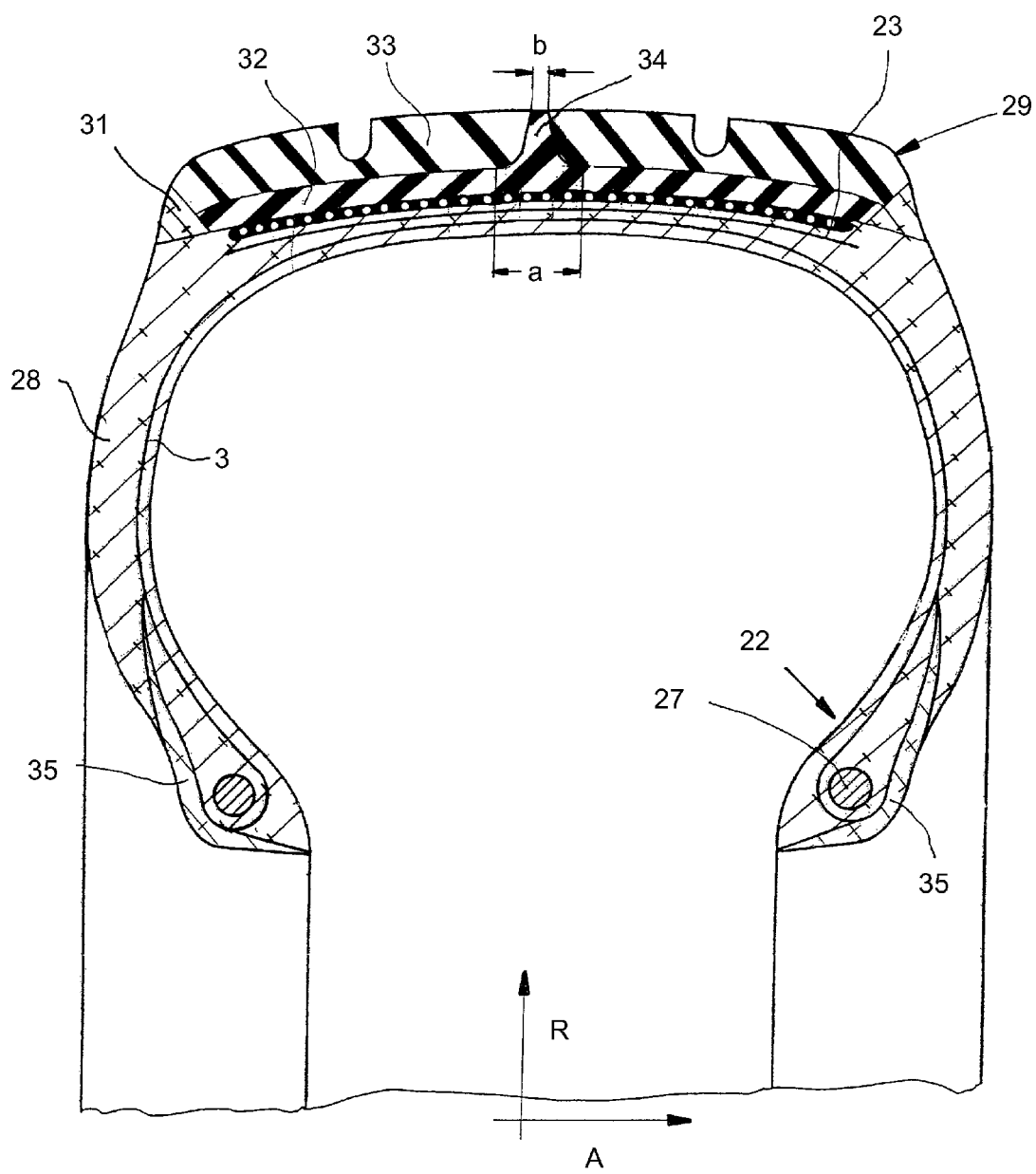
FIG. 1 is a diagrammatic, cross-sectional view of a pneumatic vehicle tire according to the invention.

Represented in FIG. 1 by way of example is the buildup of a pneumatic vehicle tire, in which a first carcass ply of a carcass 3 of a radial type of construction reaches around a bead core 27 with a bead filler (not represented any more specifically) in a right-hand bead region 22 formed for fastening the pneumatic vehicle tire on a rim, outside an air-impermeable inner layer over the right-hand shoulder region and the zenith plane to the bead core 27 with a bead filler that is formed in the left-hand bead region 22 and around which the ply is laid in the conventional way. A second carcass ply of the carcass 3, which is likewise made to extend from the side of the tire represented on the right in FIG. 1 to the side represented on the left, is laid in a conventional way over the first carcass ply. In a conventional way, a bead strip of a known type (not represented any more specifically), a bead reinforcer of a known type (not represented any more specifically) and a flange profile 35 are formed in the bead region 22, and a sidewall rubber material 28, reaching from the flange profile 35 into the shoulder region, is laid on. Arranged outside the carcass plies of a radial type of construction, a number of breaker belt plies of a breaker belt 23 with steel cords embedded in rubber reach over the circumference of the tire. Additionally formed on the breaker belt plies of the breaker belt 23, between the breaker belt plies 23 and the tread rubber 29, is a bandage ply of a known type (not represented) of the breaker belt 23 with strengthening supports aligned in the circumferential direction. In the shoulder strip, shoulder strips 31 are additionally laid on in a known way. The completion of the tire buildup is formed in a known way by a profiled tread rubber 29.

A tread rubber 29 is built up in a known way from a radially outer rubber ply (cap) 33 and a radially inner rubber ply (base) 32.

The thickness of the radially inner rubber ply (base) 32 is less than 0.6 mm, for example it is 2 to 3 mm.

The radially outer rubber ply (cap) 33 is formed in a known way with a tread rubber mixture that is suitable for a cap, with a high proportion of silica, and consequently with a relatively low electrical conductivity. The radially inner rubber ply (base) 32 is formed in a known way with a tread rubber mixture that is suitable for a base, with a high proportion of carbon black, consequently with a relatively high electrical conductivity in comparison with the tread rubber mixture that is used for the cap.

As represented in FIG. 1, to reduce the risks of electrostatic charges that can occur during driving, there is a web 34 that is made to extend over the entire circumference of the pneumatic vehicle tire, radially from the radially inner rubber ply (base) 32 through the radially outer rubber ply (cap) 33 to the radially outer peripheral surface of the pneumatic vehicle tire, forming the contact surface with the surface of the road. The web 34 is formed from the same tread rubber mixture from which the radially inner rubber ply (base) 32 is formed, with a high proportion of carbon black, and consequently with a relatively high electrical conductivity in comparison with the tread rubber mixture used for the cap. In the axial direction A of the pneumatic vehicle tire, the web 34 extends in its sectional plane with the radially outer peripheral surface of the radially inner rubber ply (base) 32 over a length of extent a and steadily decreases in its axial extent outward along its radial extent and, in the sectional plane with the radially outer peripheral surface of the pneumatic vehicle tire that forms the contact surface with the road surface, reaches an axial extent over a length of extent b, where b<a.

The cross section of the web in a sectional plane that is represented in FIG. 1 and contains the axis of the pneumatic vehicle tire has in one embodiment a contour profile with a progression of the amount of its axial extent that decreases degressively along its radial extent from the inside outward in the radial sense.

Figure 2:
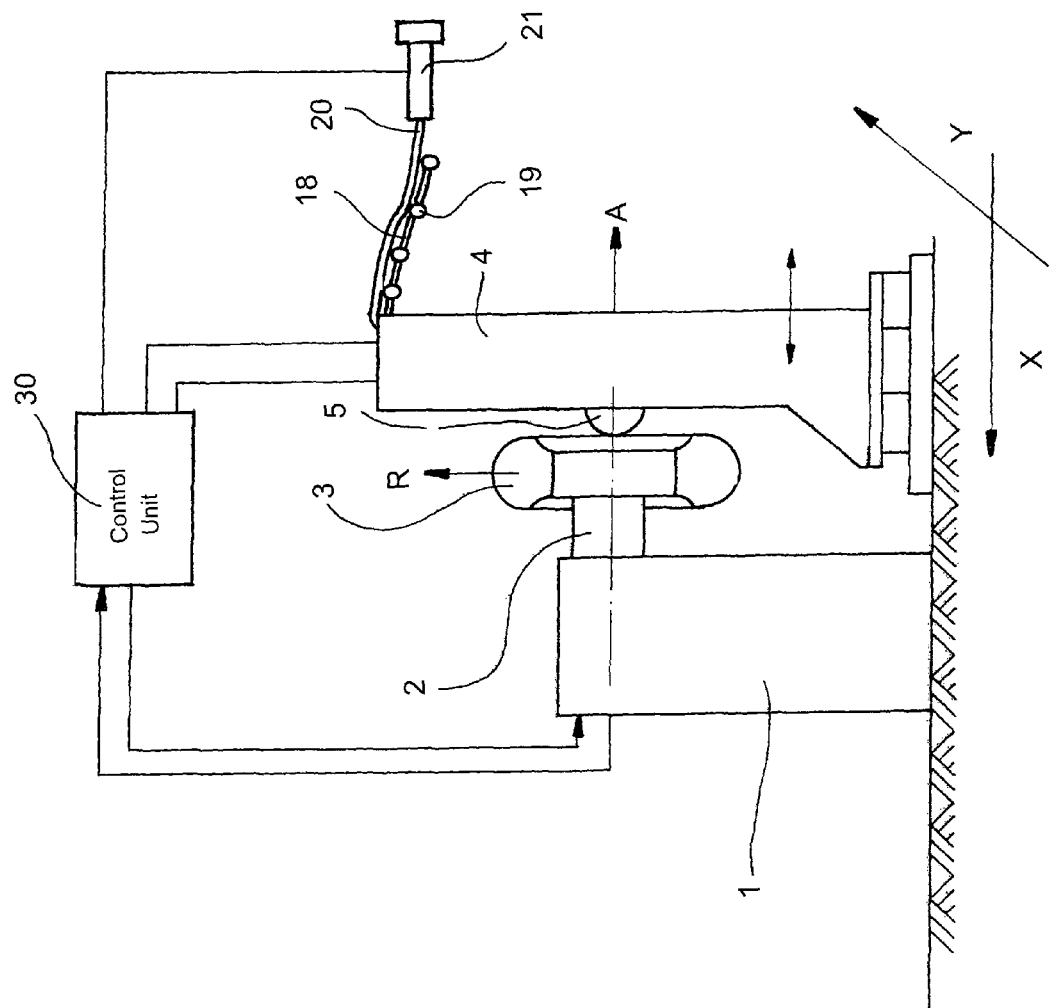
FIG. 2 is a schematic representation of a station for winding strip-shaped rubber material onto a green tire, with a green tire built up on a drum and a winding head.

To produce the pneumatic vehicle tire, an unvulcanized green tire without a tread rubber—as represented in FIG. 2—is built up on a clamping head 2, which is rotatably mounted in a framework 1 and driven in a rotationally controlled manner by a control unit 30, coaxially with respect to the clamping head 2 and is fastened.

Figure 5:
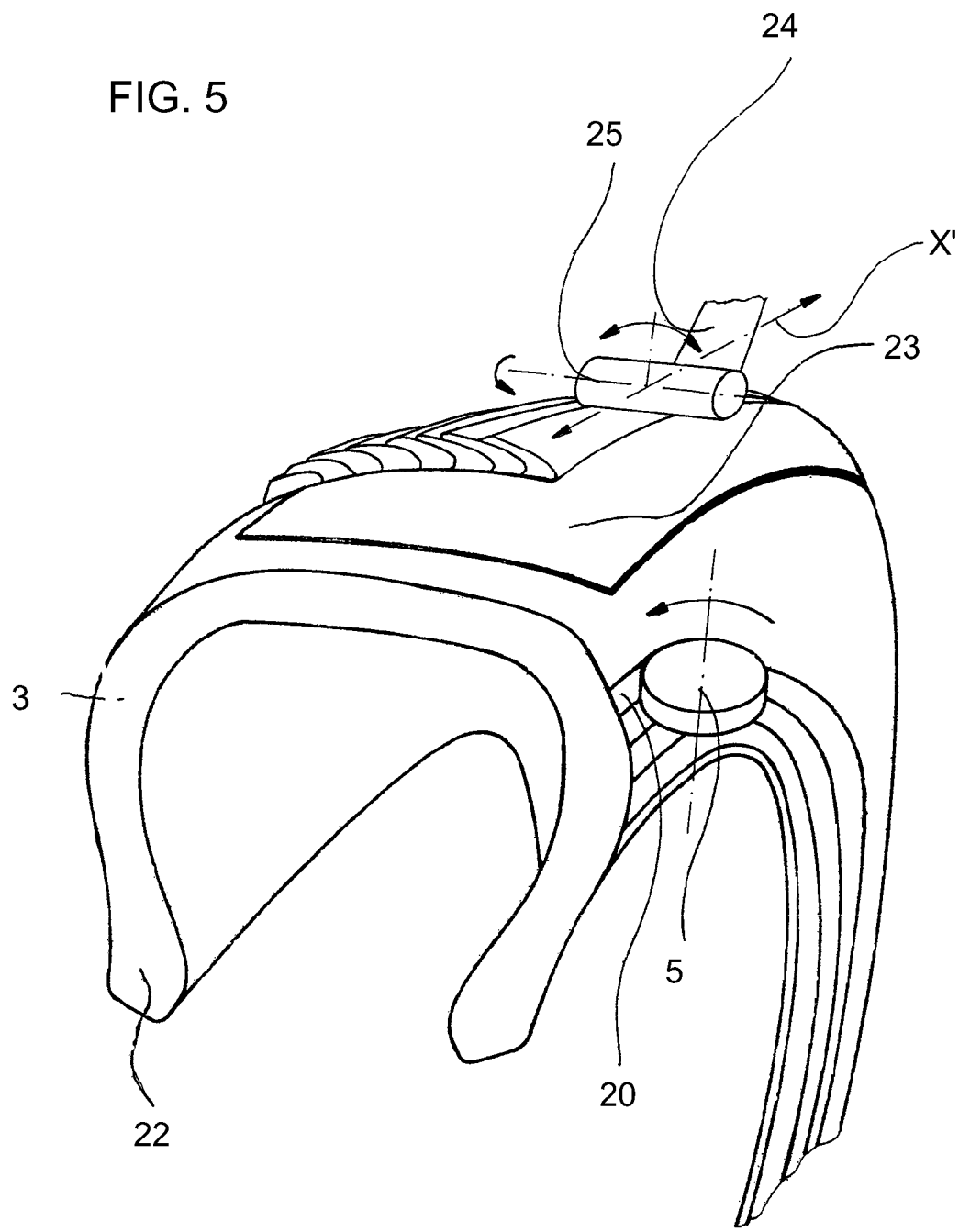
FIG. 5 is a diagrammatic, perspective view of the process of winding on a rubber strip to create a tire sidewall and to create a tread rubber.

The green tire contains—as represented in FIG. 5—the carcass 3 formed in a conventional way, containing one or more non-illustrated plies of strengthening supports embedded in rubber, which are made to extend axially from bead region 22 to bead region 22 of the green tire and respectively wrapped around the bead core (not represented any more specifically for purposes of simplification) with a bead filler built up on it. In a conventional way, a bead strip of a known type (not represented any more specifically), a bead reinforcer of a known type (not represented any more specifically) and a flange profile (not represented in FIG. 5 for purposes of simplification) are formed in the bead region 22. A breaker belt 23 with a number of breaker belt plies (not represented in FIG. 5 for purposes of simplification) and one or more bandage plies built up on the breaker belt reach over the circumference of the tire, arranged outside the carcass plies of a radial type of construction.

The green tire is toroidally formed and fastened on the clamping head 2.

In FIG. 2, a winding head 4 is additionally represented. For winding onto a new tire sidewall, rubber material 20 in the form of a round cord or ribbon is drawn out of an extruder 21 of a known type over a roller carrier that is fastened to the winding head 4 and has conveying rollers 19 mounted rotatably one behind the other in the conveying direction in a frame 13 of the roller carrier, and following that through between two holding plates 16 and 17, which are respectively fastened to a reciprocating piston 14 or 15 of a pneumatically or hydraulically actuable reciprocating piston cylinder, actuated in a controlled manner by the control unit 30, in a frame 13 mounted displaceably in the winding head 4, following that through between two reciprocating pistons of a reciprocating piston cylinder of a cutting device 9 that can respectively be actuated hydraulically or pneumatically and are actuated in a controlled manner by the control unit 30, each provided with a reciprocating piston cutter 10 or 11, and through between two calendar rolls or rollers 7 and 8 of a forming calendar 6 that are arranged downstream in the conveying direction, interact with each other and are driven in a rotationally controlled manner by the control device 30, the rubber material being drawn by the calendar rolls, and conveyed further over deflecting rollers of a known type onto a downstream laying roller 5. By use of the laying roller 5, the ribbon-shaped material shaped by the profiled calendar rolls 7 and 8 of the forming calendar 6 is rolled up under pressure—as can be seen in FIG. 1 and FIGS. 4A-4G—onto the carcass of the green tire between the bead region 22 and the tread of the tire to be produced.

Figure 3:
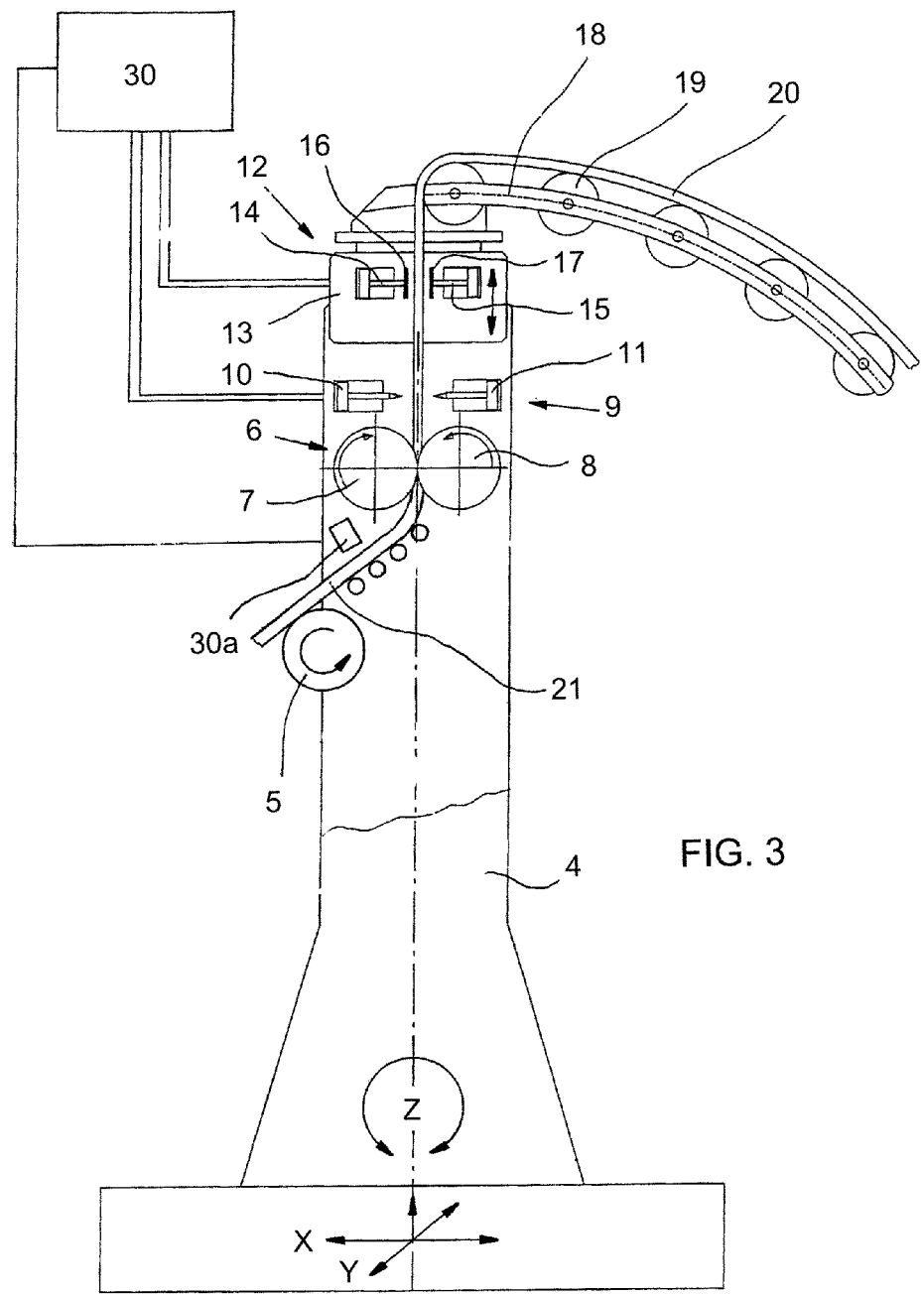
FIG. 3 is a schematic sectional representation of a winding head.

For this purpose, first the winding head 4 is displaced parallel to the axis of rotation of the clamping head 2 in the x direction represented in FIGS. 2 and 3 to the extent that the laying roller 5 comes into contact with the green tire. By stepless displacement under the control of the control unit 30 and by a known non-illustrated displacing device in the coordinate direction x parallel to the axis of rotation of the clamping head 2 and the coordinate direction y perpendicular to the axis of rotation of the clamping head 2, the winding head 4 can in this case be respectively positioned in such a way that the laying roller 5 is in contact with the green tire 3 with the desired pressure. In addition—as represented in FIG. 3—the winding head 4 can be steplessly pivoted in a controlled manner about axis z aligned perpendicularly to the x-y plane in a known way that is not represented, so that the winding head 4 can be respectively positioned by the control unit 30 such that the laying roller 5 respectively assumes with its peripheral surface the alignment desired for winding on with respect to the surface of the green tire.

As a result—as represented in FIG. 5—the rubber material 20 shaped by the calendar rolls 7 and 8 is continuously wound onto the carcass from the inside outward in the radial sense during the controlled rotation of the green tire about the axis of rotation of the clamping head 2. The individual turns may in this case be wound out next to one another or else, if need be, also overlapping one another. This is possible by corresponding advancement of the movement of the winding head 4 in the x-y plane along the contour of the toroidal green tire. If need be, for this purpose the alignment of the laying roller 5 in relation to the surface of the contour of the toroidal green tire is continuously corrected by controlled pivoting of the winding head 4 about the z axis.

If required, in an embodiment that is not represented, the laying roller 5 is additionally formed such that it is steplessly displaceable in a controlled manner in the z direction. In the case of such an embodiment, the winding-on position of the laying roller 5 with respect to the green tire can also be set in an individually controlled manner in the z direction or changed during the winding.

As soon as the rubber material in the form of a round cord or ribbon that is drawn between the reciprocating piston cutters 10 and 11 has reached such a length that it corresponds to the winding-on length desired for the production of the sidewall of the green tire, a cutting process is initiated by control unit 30. For this purpose, the reciprocating pistons of the reciprocating piston cutters 10 and 11 are pneumatically or hydraulically displaced toward each other in the respective reciprocating piston cylinder and, as a result, the rubber material in the form of a round cord or ribbon is cut up by the reciprocating piston cutters 10 and 11 acting from both sides.

As soon as the end of the cut-off rubber strip that is created by the cutting process has been pressed by the laying roller 5 onto the sidewall of the green tire, the winding head is removed from the green tire by controlled displacement in the x-y plane.

For winding onto a new tire sidewall, a new green tire is mounted on the clamping head 2 and the winding head 4 is in turn brought up to the green tire in a controlled manner to the extent that the winding process for building up the tire sidewall can be initiated.

Figure 4A:
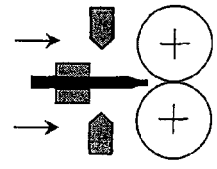
FIGS. 4A-4G are simplified schematic representations of the winding head with method steps represented in FIGS. 4A to 4G to explain the way in which rubber material is supplied and cut to length.
Figure 4B:
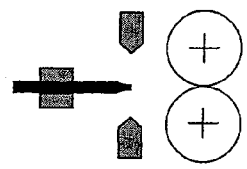
Figure 4C:
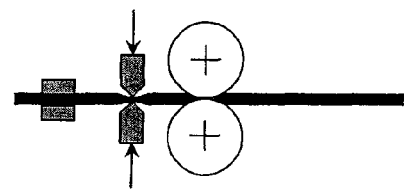
Figure 4D:
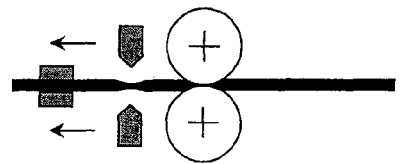
Figure 4E:
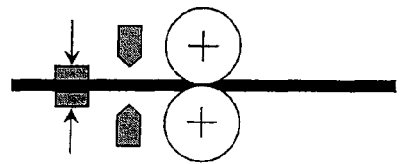
Figure 4F:
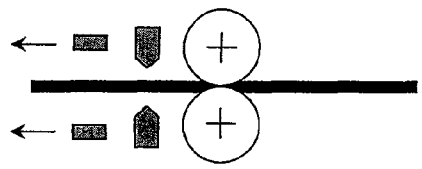
Figure 4G:
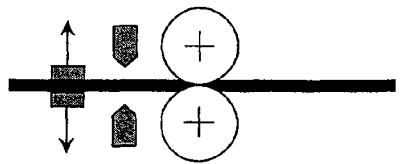

To introduce the beginning of a rubber strand in the form of a round cord or ribbon newly created by the extruder between the calendar rolls 7 and 8, first the reciprocating pistons 14 and 15 are moved hydraulically or pneumatically under the control of the control unit 30 toward each other to the extent that the holding plates 16 and 17 aligned parallel to the rubber ribbon 20 respectively come into frictional contact with the rubber ribbon 20 and firmly hold the rubber ribbon 20 between them. After that, under the control of the control unit 30, the frame 13, which is mounted displaceably in the winding head 4 parallel to the conveying direction of the rubber ribbon 20, is moved in the conveying direction toward the calendar rolls 7 and 8 of the forming calendar 6, so that the rubber ribbon 20 is introduced between the calendar rolls 7 and 8 and is drawn in by the calendar rolls 7 and 8 through the calendar gap between the calendar rolls 7 and 8. This state is represented in FIG. 4A. After that—as can be seen in FIG. 4F—the contact between the holding plates 16 and 17 and the rubber strip is in turn brought to an end by hydraulic actuation of the reciprocating pistons 14 and 15 perpendicularly to the conveying direction of the rubber ribbon 20 away from the rubber material. After that—as represented in FIG. 4G—the frame 13 is in turn raised into its starting position.

For cutting, first the reciprocating pistons 14 and 15 are moved hydraulically or pneumatically under the control of the control unit 30 toward each other to the extent that the holding plates 16 and 17 aligned parallel to the rubber ribbon 20 respectively come into frictional contact with the rubber ribbon 20 and firmly hold the rubber ribbon 20 between them. After that, under the control of the control unit 30, the frame 13, which is mounted displaceably in the winding head 4 parallel to the conveying direction of the rubber ribbon 20, is moved at the conveying speed of the calendar rolls 7 and 8 in the conveying direction toward the calendar rolls 7 and 8 of the forming calendar 6, so that the rubber ribbon 20 is led in the direction of the calendar gap formed between the calendar rolls 7 and 8, wherein the rubber ribbon 20 continues to be drawn in by the calendar rolls 7 and 8 through the calendar gap between the calendar rolls 7 and 8. This state is represented in FIG. 4A. After that, the frame 13 is moved back again in a controlled manner in the counter conveying direction. The rubber ribbon 20 respectively clamped between the holding plates 16 and 17 and between the calendar rolls 7 and 8 is thereby stretched between the two clamping positions. This produces a constriction of the rubber ribbon 20. The position of the reciprocating piston cutters 10 and 11 in the winding head 4 is chosen in this case such that they are positioned in the region of the expected thinnest cross section of the stretched material. This is represented in FIG. 4B. After that—as can be seen in FIG. 4C—the reciprocating piston cutters 10 and 11 are moved hydraulically or pneumatically in a controlled manner toward each other, so that the rubber ribbon 20 is severed in the region of the thinnest cross section. The end of the preceding strip material is conveyed further to the green tire. As can be seen in FIG. 4D, the beginning of the next strip material is also of a tapered form and—as can be seen in FIG. 4E—is introduced into the calendar gap between the calendar rolls 7 and 8 by displacing the frame 13 in the conveying direction. After that—as can be seen in FIG. 4F—the contact between the holding plates 16 and 17 and the rubber strip is in turn brought to an end by hydraulic actuation of the reciprocating pistons 14 and 15 perpendicularly to the conveying direction of the rubber ribbon 20 away from the rubber material. After that—as represented in FIG. 4G—the frame 13 is in turn raised into its starting position.

As can be seen in FIG. 4C, the end of the preceding strip is also of a tapered form. The tapering of the beginning and end of the rubber strip makes it possible when winding onto the surface of the green tire at the beginning and at the end to obtain a uniform transition with the surface of the green tire.

To determine the length of the rubber strip material for correctly cutting to the length to be wound on, in one embodiment the length is determined from the available data on the conveying speed, which is determined for example from the rotational speed of the calender rolls 7 and 8 or is measured directly, and the conveying time. In an alternative embodiment—as represented in FIG. 2—the length of the conveyed rubber strip material is measured by sensors 30$a$ formed in the winding head for determining a rubber ribbon of a known type and the data are passed on to the control unit 30 for processing. The sensors 30a are arranged for example between the cutting device with reciprocating cutters 10 and 11 and the forming calender 6 with the calender rolls 7 and 8 or else—as represented in FIG. 2—the calender in the conveying direction.

As represented in FIG. 5, the tread rubber mixtures for building up the radially inner rubber ply (base) 32 and the radially outer rubber ply (cap) 33 of the tread rubber 29 of the tire are also wound on by the winding head 4—as represented above—from a rubber strip produced in a correspondingly identical way, over a laying roller 25 of the winding head 4. Represented in this respect in FIG. 5 is an embodiment in which the rubber strip is wound onto a breaker belt 23 of a known type built up onto the carcass of the green tire. Instead of the radial movement along the sidewall contour, the laying takes place with a controlled axial movement along the contour of the pneumatic vehicle tire in the region of the tread rubber. During the controlled rotation of the green tire about the axis of rotation of the clamping head 2, the rubber material 20 shaped by the calendar rolls 7 and 8 is continuously wound onto the breaker belt 23 in the axial direction A along the axial extent of the breaker belt. The individual turns may in this case be wound out next to one another or else, if need be, also overlapping one another. This is possible by corresponding advancement of the movement of the winding head 4 in the x-y plane along the contour of the toroidal green tire. If need be, for this purpose the alignment of the laying roller 5 in relation to the surface of the contour of the toroidal green tire is continuously corrected by controlled pivoting of the winding head 4 about the z axis.

It is possible to form different thicknesses of the built-up plies of the tread rubber and/or of the sidewall respectively by controlled changing of the advancement of the winding head along the tire contour to be wound onto, and consequently by deliberate different overlapping of the individual turns of the wound strip material formed next to one another.

For this purpose, the contouring and thickness distribution can in addition be influenced in a controlled manner by deliberately changing the angle of alignment of the laying roller 5 or the laying roller 25 in relation to the surface of the green tire. If need be, for this purpose the alignment of the laying roller 5 or the laying roller 25 in relation to the surface of the contour of the toroidal green tire is continuously corrected by controlled pivoting of the laying roller 5 or the laying roller 25 about the x' axis, which is directed in the rolling direction and intersects the axis of rotation of the laying roller 5 or the laying roller 25. The x' axis and a directional arrow representing the direction of pivoting movement are depicted in FIG. 5 for the example of the laying roller 25.

It is similarly possible to wind the built-up plies of the tread rubber or the sidewall on from a number of such rubber strips. In this case, these rubber strips may, if need be, be of different rubber material and/or differently shaped. The different shaping takes place for example by modified calendar rolls 7 of the forming calendar.

In one embodiment, the shoulder strip 31 is wound on together with the sidewall as a joint component, in another embodiment the shoulder strip 31 is wound on as an independent component following the formation of the sidewall 28 and the tread rubber 29.

Figure 6:
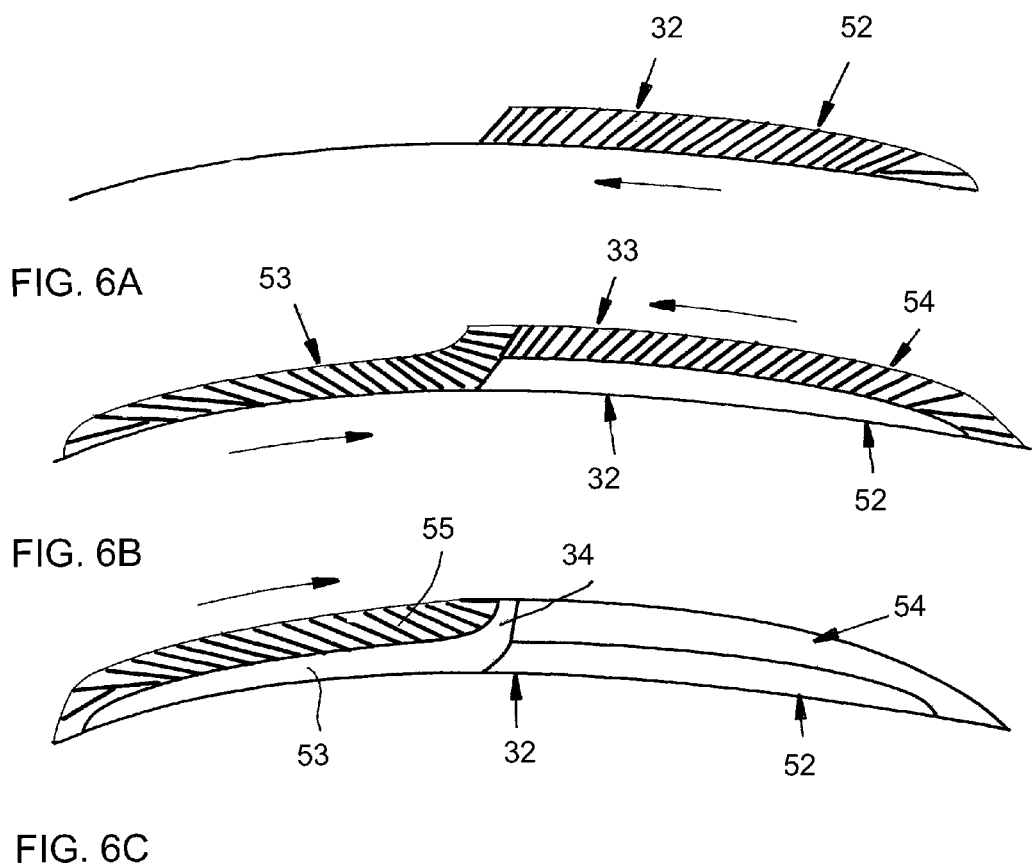
FIGS. 6A to 6C are diagrammatic, cross-sectional views showing an explanation of the winding process for producing a tread rubber with a web in a first embodiment, of the tread rubber on the basis of an exemplary embodiment with a single-ply base and a single-ply cap.

FIGS. 6A to 6C schematically show the winding pattern of a tread rubber formed in this way by winding from a radially inner tread rubber ply (base) 32 and a radially outer tread rubber ply (cap) 33 with a web 34.

For this purpose, as can be seen in FIG. 6A, a right-hand side 52 of the base ply 32 is produced, formed by winding a rubber ribbon 24 produced from a base mixture of high electrical conductivity—for example with a high proportion of carbon black. In the case of this exemplary embodiment, the right-hand side 52 of the base ply 32 is produced from the right-hand tire shoulder to the left over the entire axial extent of the breaker belt plies (not represented) to the desired positioning of the web 34, with overlapping of the individual neighboring turns, lying next to one another, of the rubber ribbon 24 wound on helically about the axis of the green tire. As this happens, controlled changing of the advancement of the winding head in the axial direction A of the green tire has the effect of setting the overlapping of the turns in a controlled manner.

Subsequently—as represented in FIG. 6B—the right-hand side 54 of the cap ply 33 is produced, formed by winding a rubber ribbon 24 produced from a cap mixture of lower electrical conductivity in comparison with the base mixture—for example with a high proportion of silica—onto the radially outer side of the right-hand side 52 of the base ply 32 produced as described above. In the case of this exemplary embodiment, the right-hand side 54 of the cap ply 33 is produced from the right-hand tire shoulder to the left over the entire axial extent of the breaker belt plies (not represented) to the desired positioning of the web 34, with overlapping of the individual neighboring turns, lying next to one another, of the rubber ribbon 24 wound on helically about the axis of the green tire. As this happens, controlled changing of the advancement of the winding head in the axial direction A of the green tire has the effect of setting the overlapping of the turns in a controlled manner.

For the sake of simplicity, in FIG. 6B the wound turns of the right-hand side 52 of the base ply 32 are no longer individually depicted.

Subsequently—as represented in FIG. 6B—the left-hand side 53 of the base ply 32 is produced, formed by winding from a rubber ribbon 24 produced from the base mixture of high electrical conductivity—for example with a high proportion of carbon black. In the case of this exemplary embodiment, the left-hand side 53 of the base ply 32 is produced from the left-hand tire shoulder to the right over the entire axial extent of the breaker belt plies (not represented) up to the already built-up right-hand side 52 of the base ply 32, with overlapping of the individual neighboring turns, lying next to one another, of the rubber ribbon 24 wound on helically about the axis of the green tire. The rubber ribbon 24 is wound along the end face of the right-hand side 52 of the base ply 32 and the right-hand side 54 of the cap ply 33 that are facing the left-hand side, with overlapping of the individual neighboring turns, lying next to one another, helically and/or spirally about the axis of the green tire, radially outward up to the radially outer periphery of the tread rubber to be built-up, to form the web 34. As this happens, controlled changing of the advancement of the winding head in the axial direction A of the green tire has the effect of setting the overlapping of the turns in a controlled manner.

Subsequently—as represented in FIG. 6C—the left-hand side 55 of the cap ply 33 is produced, formed by winding from a rubber ribbon 24 produced from the cap mixture of lower electrical conductivity in comparison with the base mixture—for example with a high proportion of silica—onto the radially outer side of the left-hand side 53 of the base ply 32 produced as described above. In the case of this exemplary embodiment, the left-hand side 55 of the cap ply 33 is produced from the left-hand tire shoulder to the right over the entire axial extent of the breaker belt plies (not represented)

up to the web 34 wound from the rubber ribbon of the left-hand side 53 of the base ply 32 along the end face of the right-hand side 52 of the base ply 32 and the right-hand side 54 of the cap ply 33 that are facing the left-hand side, with overlapping of the individual neighboring turns, lying next to one another, of the rubber ribbon 24 wound on helically about the axis of the green tire. As this happens, controlled changing of the advancement of the winding head in the axial direction A of the green tire has the effect of setting the overlapping of the turns in a controlled manner.

The web 34—in the form represented in FIG. 6B—is formed in the sectional plane with the radially outer peripheral surface of the radially inner ply 32 (base) with its cross-sectional contour having an axial length of extent a. The cross-sectional contour of the web 34 is formed along the radial extent of the green tire from the inside outward in the radial sense with a degressively decreasing length of extent. In the radial position of the maximum radially outer extent of the web 34, the latter extends in the axial extent only over an axial length of extent b, where b<a.

Figure 7:
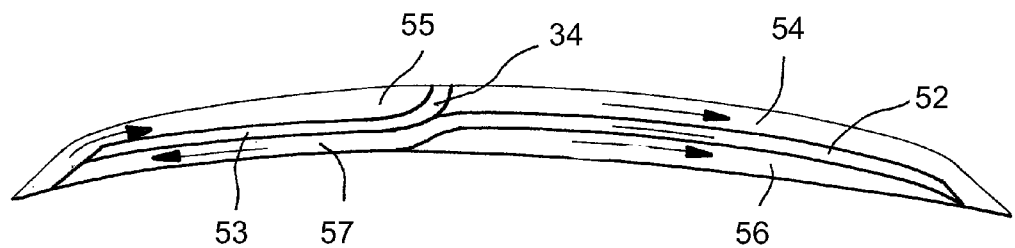
FIG. 7 is a diagrammatic, cross-sectional view of the winding process for producing a tread rubber with a web in a second embodiment, of the tread rubber on the basis of an exemplary embodiment with a two-ply base and a single-ply cap.

In FIG. 7 there is shown the winding pattern of an alternative way of producing a tread rubber with two radially inner base plies formed one on top of the other. For this purpose, first the right-hand side 52 of the radially inner ply of the base layer 32 is produced by winding from a rubber ribbon 24 produced from a base mixture of high electrical conductivity—for example with a high proportion of carbon black. In the case of this exemplary embodiment, the right-hand side 56 of the radially inner ply is produced from the right-hand axial edge position of the web 34 to be formed in the axial direction to the right over the entire axial extent of the breaker belt plies (not represented) up to the right-hand tire shoulder, with overlapping of the individual neighboring turns, lying next to one another, of the rubber ribbon 24 wound on helically about the axis of the green tire. There, after changing the direction of the advancement of the winding head, the rubber ribbon 24 is wound on in the opposite axial direction on the radially outer surface of the built-up right-hand side 56, creating the right-hand side 52 of the radially outer ply of the base layer 32 and, in axial extension thereof, the left-hand side 57 of the radially inner ply of the base layer 32 up to the left-hand tire shoulder. There, after again changing the direction of the advancement of the winding head, the rubber ribbon 24 is wound on in the opposite axial direction on the radially outer surface of the built-up left-hand side 56, creating the left-hand side 53 of the radially outer ply of the base ply 32. During this, the right-hand side 54 of the cap ply 33 is built up—as explained in connection with FIG. 6B. On reaching the step formed at the transition between the right-hand side 52 of the radially outer base ply to the left-hand side 57 of the radially inner base ply at the axial end face of the right-hand side 56 of the radially inner base ply, the winding operation for building up the left-hand side 53 of the radially outer base ply is continued by further helical and/or spiral winding radially outward along the step and the axial end side of the right-hand side 54 of the cap ply, to form a web. As this happens, controlled changing of the advancement of the winding head in the axial direction A of the green tire has the effect of setting the overlapping of the turns in a respectively controlled manner. The left-hand side 55 of the cap is built-up in a way analogous to the embodiment of FIG. 6C.

Figure 8:
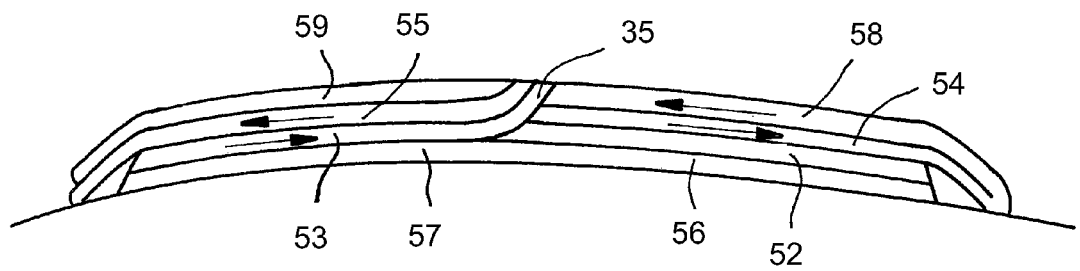
FIG. 8 is a diagrammatic, cross-sectional view for explaining the winding process for producing a tread rubber with a web in a third embodiment of the tread rubber on the basis of an exemplary embodiment with a two-ply base and a two-ply cap.

In FIG. 8 is the winding pattern of a further alternative way of producing a tread rubber with both two radially inner base plies, formed radially one on top of the other, and two radially outer cap plies, formed radially one on top of the other. The forming takes place as in the exemplary embodiment of FIG. 7, but after building up the right-hand side 58 of the cap ply the direction of advancement of the winding head is changed and the rubber ribbon of the right-hand side 58 of the cap ply is wound back on the radially outer surface of the wound-on right-hand side 54 of the cap ply and in this way the right-hand side 58 of a further cap ply is formed, reaching axially up to the position of the desired web 34. To form the web 34, the rubber ribbon of the left-hand side 53 of the outer base ply is then additionally wound radially outside the right-hand side 54 of the radially inner cap ply, along the axial end side of the right-hand side 58 of the radially outer cap ply, radially outward to the periphery of the tire. After building up the left-hand side 55 of the cap ply, the direction of advancement of the winding head is changed and the rubber ribbon of the left-hand side 55 of the cap ply is wound back on the radially outer surface of the wound-up left-hand side 55 of the cap ply and in this way the left-hand side 59 of a further cap ply is formed, extending up to the left-hand shoulder.

In alternative winding, it is also possible to build up the left-hand side 55 of the radially inner cap ply and the left-hand side 59 of the radially outer cap ply with a changed winding direction, the winding operation of the radially inner cap ply taking place from the web outward in the axial sense toward the left-hand shoulder and the winding operation of the radially outer cap ply taking place from the left-hand shoulder inward in the axial sense toward the web.

Figure 9:
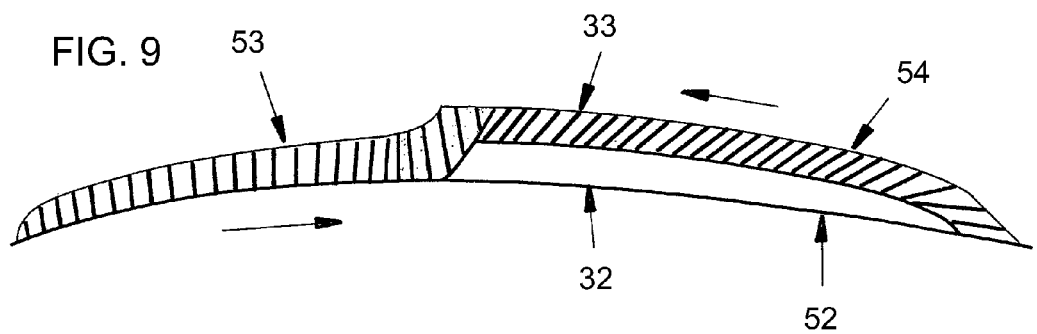
FIG. 9 is a diagrammatic, cross-sectional view for explaining the shaping of a web in an alternative tilting position of the wound rubber ribbon.

In FIG. 9, a further embodiment of the shaping of the web 34 is represented. In FIG. 6B, the rubber ribbon 24 is laid on with a small angle of inclination in relation to the axial A in its cross section for the forming of the web and, as a result, the web 34 is formed with the inclusion of turns spirally arranged radially one on top of the other. In FIG. 9, the rubber ribbon 24 is laid on with a great angle of inclination in relation to the axial A in its cross section for the forming of the web and, as a result, the web 34 is formed primarily with the inclusion of turns helically overlapping axially next to one another.

The green tire produced in this way, as in the various embodiments in connection with the embodiments explained with FIGS. 5 to 8, with a radially inner tread rubber ply (base) 32 and a radially outer tread rubber ply (cap) 33, with the web 34 made to extend through the radially outer tread rubber ply (cap) 33, is removed from the clamping head in a known way (not represented any more specifically) and fed to a vulcanizing press of a known type (not represented any more specifically), in which it is vulcanized while shaping the tread rubber profiling and the sidewall design.

Instead of the aforementioned clamping head 2, in an alternative way of producing the green tire it is also built up on a tire building drum of a known type for having the tread rubber and/or sidewalls wound on.

Figure 10A:
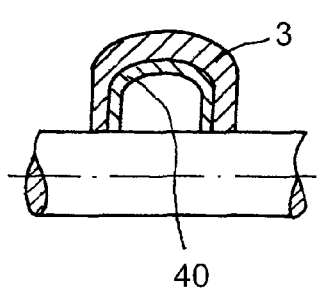
FIG. 10A is a diagrammatic, cross-sectional view of a green tire built up on an expanded shaping bladder to explain the building up of the tread rubber.

As represented in FIG. 10A, in one embodiment the green tire 3 is built up on a toroidally expanded bladder 40, for example a shaping bladder, for having the tread rubber and/or sidewalls wound on. The winding operation for building up the tread rubber and/or the sidewalls takes place as explained in the aforementioned exemplary embodiments.

Figure 10B:
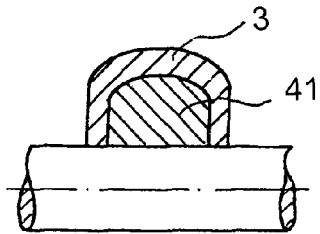
FIG. 10B is a diagrammatic, cross-sectional view of a green tire built up on a toroidal core to explain the building up of the tread rubber.

As represented in FIG. 10B, in another embodiment the green tire 3 is built up on a toroidally formed fixed building core 41, for having the tread rubber and/or sidewall wound on. The winding operation for building up the tread rubber and/or the sidewalls takes place as explained in the aforementioned exemplary embodiments.

Figure 10C:
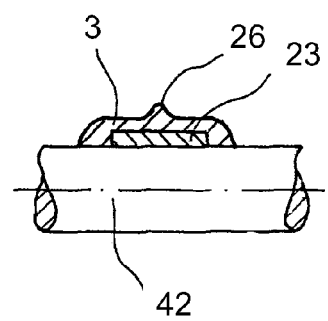
FIG. 10C is a diagrammatic, cross-sectional view of a breaker belt assembly built up on a substantially cylindrical building drum to explain the building up of the tread rubber.

In the embodiment represented in FIG. 10C, the breaker belt plies of a breaker belt 23 are built up on a belt building drum 42 of a known type, with a substantially cylindrically formed radially outer surface. In the same way as explained in the embodiments with respect to FIGS. 5 to 9, the radially inner tread rubber ply (base) 32 and an accumulation of material 26 are wound onto the breaker belt 23 helically around the belt building drum 42. As explained in connection with FIGS. 5 to 9, a web 34 is thereby also helically and/or spirally wound on. The tread rubber/breaker belt assembly prefabricated in this way, containing the breaker belt 23 and the tread rubber, is removed in a known way (not represented any more specifically) from the belt building drum 42 and laid onto a carcass assembly, which is built up on a carcass building drum of a known type (not represented) from the component parts for forming the bead region with the bead core, bead filler, bead reinforcing strip and other desired components for building up the bead region, the inner layer and the carcass ply, and is toroidally shaped, and the tread rubber/breaker belt assembly is connected to said carcass assembly in a known way.

In one embodiment, in the course of the production of the carcass assembly on a flat carcass building drum of a known type, the sidewalls are wound on the carcass with a winding head formed as explained with respect to FIGS. 2 to 4, or built up in a conventional way.

In another embodiment, after toroidal elevation and before joining together with the breaker belt assembly, the sidewall is wound onto the carcass in the way described in connection with the explanations with respect to FIGS. 2 to 4 or laid on in a conventional way.

In another alternative embodiment, after joining the tread rubber/breaker belt assembly together with the toroidally shaped carcass assembly, the sidewall is wound on in the way described in connection with the explanations with respect to FIGS. 2 to 4 or laid on in a conventional way.

The rubber mixture of high electrical conductivity that is used for the radially inner tread rubber ply (base) 32 and for forming the web 34 is for example a rubber mixture that has after vulcanization a resistivity of no more than $10^6$ Ω·cm at 25° C. The rubber mixture of low electrical conductivity that is used for forming the radially outer tread rubber ply (cap) 33 is for example a rubber mixture that has after vulcanization a resistivity of $10^8$ Ω·cm at 25° C.

The axial position of the web 34 is chosen such that the web 34 is formed in the axial region of extent of radially raised profile elements, for example circumferential ribs or rows of profile blocks, of the intended tread rubber profile and is in definite contact with the road surface during the rolling of the pneumatic vehicle tire.

In one embodiment, instead of the aforementioned singly formed web 34, such a web 34 is formed in two or three different axial positions of the tread rubber profile.

The cross section of the web 34 is formed such that it is symmetrically triangular in its base contour and perpendicular to the inner tread rubber ply (base) 32, with a degressively decreasing axial extent in the radial direction from the inside outward—as represented above. In another embodiment, the base contour is a rectangular parallelogram or mushroom-shaped, depending on the individually desired profile to be contoured.

As represented in FIG. 8, in another embodiment the web is not formed perpendicular to the inner tread rubber ply (base) 32, but with a deliberately obliquely inclined contouring.

In a further embodiment, after building up of the cap, the web radially reaches slightly beyond the radial extent of the cap and is rolled on the radial outer surface of the cap by pressing rollers (not represented).

The invention claimed is:

1. A method for producing a tread rubber for a pneumatic vehicle tire, which comprises the steps of:

forming a radially inner first layer from a first rubber material;

forming a radially outer second layer from a second rubber material, the outer second layer defining a ground-contact surface of the pneumatic vehicle tire, the first rubber material having a higher electrical conductivity than the second rubber material, the first rubber material extending radially outward through the outer second layer up to the ground-contact surface in a form of a web made to extend over a circumference of the pneumatic vehicle tire and axially divides the outer second layer; and building up a ply of the inner first layer of the first rubber material and a ply of the outer second layer of the second rubber material radially one on top of the other on a rotationally symmetrical building surface, on one of two axial sides of the web to be formed, in each case in a first region of axial extent which reaches up to a position of the web;

subsequent to the building up step, starting from the other axial side of the web to be formed, in a second region of axial extent, the ply of the inner first layer is filled in an axial direction by helically winding on a ribbon-shaped rubber strip of the first rubber material, with a number of turns arranged axially next to one another or at least partly axially overlapping about an axis of rotation up to the ply already formed for the inner first layer in the first region of axial extent, whereupon, on reaching the ply formed for the inner first layer in the first region of axial extent, the ribbon-shaped rubber strip is further wound in contact with the axial end face first of the ply formed for the inner first layer in the first region of extent and then of the outer second layer, using a number of turns to form the web in a helical or spiral manner radially outward about the axis of rotation up to the tread rubber to be built up; and in the second region of axial extent, subsequent to forming the web, the outer second layer of the second rubber material is built up axially up to the web.

2. The method for producing the tread rubber for the vehicle tire according to claim 1, which further comprises building up the ply of the inner first layer in the first axial region of extent by helically winding on a further ribbon-shaped rubber strip of the first rubber material with a number of turns disposed axially next to one another or at least partly axially overlapping about an axis of rotation.

3. The method for producing the tread rubber for the vehicle tire according to claim 1, which further comprises building up the outer second layer in the first region of axial extent by helically winding on a further ribbon-shaped rubber strip of the second rubber material with a number of turns arranged axially next to one another or at least partly axially overlapping about the axis of rotation.

4. The method for producing the tread rubber for the vehicle tire according to claim 1, which further comprises building up the outer second layer in the second region of axial extent by helically winding on a further ribbon-shaped rubber strip of the second rubber material with a number of turns arranged axially next to one another or at least partly axially overlapping about the axis of rotation.

5. The method for producing the tread rubber for the vehicle tire according to claim 1, wherein the ply of the inner first layer, on which the outer second layer is built up, is a radially outer ply of a multi-ply inner first layer of the first rubber material, wherein another ply of the multi-ply inner first layer that is formed radially inside the radially outer ply is built up by helically winding on another ribbon-shaped rubber strip of the first rubber material with a number of turns arranged axially next to one another or at least partly axially overlapping about the axis of rotation prior to the radially outer ply being built up in the first axial region of extent.

6. The method for producing a tread rubber for a vehicle tire according to claim 5, which further comprises forming the multi-ply inner first layer as a two-ply inner first layer.

7. A method for producing a tread rubber for a pneumatic vehicle tire, which comprises the steps of:
- forming a radially inner first layer from a first rubber material;
- forming a radially outer second layer from a second rubber material, the outer second layer defining a ground-contact surface of the pneumatic vehicle tire, the first rubber material having a higher electrical conductivity than the second rubber material, the inner first layer extending radially outward through the outer second layer up to the ground-contact surface in a form of a web made to extend over a circumference of the pneumatic vehicle tire and axially divides the outer second layer;
- building up a first ply of the inner first layer of the first rubber material and a first ply of the outer second layer of the second rubber material radially one on top of the other on a rotationally symmetrical building surface, on one of two axial sides of the web to be formed, in each case in a first region of axial extent which reaches up to a position of the web;
- subsequent to building up the first ply of the outer second layer, starting from the other axial side of the web to be formed, in a second region of axial extent, the first ply of the inner first layer is filled in an axial direction by helically winding on a ribbon-shaped rubber strip of the first rubber material, with a number of turns arranged axially next to one another or at least partly axially overlapping about an axis of rotation up to the first ply already formed for the inner first layer in the first region of axial extent thus forming a second ply of the inner first layer, whereupon, on reaching the first ply formed for the inner first layer in the first region of axial extent, the ribbon-shaped rubber strip is further wound in contact with an axial end face first of the first ply formed for the inner first layer in the first region of extent and then of the first ply of the outer second layer, using a number of turns to form the web in a helical or spiral manner radially outward about the axis of rotation up to the tread rubber to be built up; and
- subsequent to forming the web, building up a second ply of the outer second layer, in the second region of axial extent, axially up to the web.

* * * * *